350-313
CROSS REFERENCE
SEARCH ROOM
178
5.4
X2661

March 18, 1958 R. J. STAHL ET AL 2,827,512

COLOR TELEVISION CAMERA

Filed Nov. 30, 1951 2 Sheets-Sheet 1

INVENTORS
ROBERT J. STAHL &
NORMAN L. HEIKES
BY
Lippincott & Smith
ATTORNEYS

COLOR TELEVISION CAMERA

INVENTORS
ROBERT J. STAHL &
NORMAN L. HEIKES
BY
Lippincott & Smith
ATTORNEYS

United States Patent Office 2,827,512

Patented Mar. 18, 1958

2,827,512

COLOR TELEVISION CAMERA

Robert J. Stahl, Redwood City, Calif., and Norman L. Heikes, Madrid, N. Mex., assignors to California Technical Industries, a corporation of California Application November 30, 1951, Serial No. 259,193

22 Claims. (Cl. 178—5.4)

This invention relates to television apparatus, and particularly to apparatus utilized for the transmission of signals from which television images are re-creatable at reception points (monitors, receivers or relays) either in colors closely approximating those of the scene at the point of transmission, or as black-and-white (monochrome) versions thereof. For simplicity, where the term "black-and-white" is used herein, it will be understood to represent also transmission in any one color or in monochrome.

Various methods of producing television image signals have been proposed for color operations. Included among such proposals is the so-called field-sequential system. In field-sequential color operations the image is analyzed in such fashion that successive fields are represented in their entirety in cyclically repeating component colors of an additive polychrome system. At reception points the images are so reproduced as to become observable in colors by the reproduction of complete fields of successively and cyclically changing characteristics representative of the different colors. The color becomes observable by viewing through a color filter which cyclically reveals the image light to the observer in different colors, or in newer proposals the color effects are directly produced upon the viewing target of a suitable direct-view color tube.

While a system of the field-sequential character has been considered as standardized by a decision rendered in September 1950, by the Federal Communications Commission, it nonetheless is not of much a nature as to be generally compatible with existing black-and-white receivers. This is because of the fact that existing black-and-white receivers cannot receive a transmission of the image analyzed in field-sequential color as a black-and-white representation without making substantial changes and modifications to the existing receiver. These receiver changes are necessitated for many reasons, included among which are, at the present date, the need of providing a field scansion rate very substantially higher than that required for systems in which the color operations and the black-and-white operations occur with generally compatible standards.

At the present time, the field scanning rate proposed for field-sequential color operations is 144 color fields per second, as compared to the now standardized commercially used black-and-white field scanning rate of 60 fields per second, which makes the ratio of field scansions 12.5. The result is that the number of lines per picture field is substantially reduced over that permissible with black-and-white and all so-called compatible color operations, assuming, of course, that the complete transmission is confined to the band of 6 megacycles now allotted for television transmission on any one station. Consequently, with field-sequential operations, the geometric picture resolution obtainable from the resulting transmission is only approximately 45% of that obtainable in black-and-white, or in compatible color television systems.

The present invention is related to an apparatus and method for improving the transmission of color television signals in systems of such character that the complete operation is maintained compatible with all existing standardized black-and-white operations. At the same time, the present invention is directed to a method and apparatus for converting light images into television signalling information where the signal conversion may be such as to follow precisely the proposals of the so-called dot-sequential system of the general type now being advocated by Radio Corporation of America and which is currently being demonstrated in both New York and Washington. The method and system herein proposed is also equally applicable and adaptable to the form of color television transmission currently being proposed by the National Television System Committee which constitutes, in a sense, some modifications of the proposals of Radio Corporation of America with ideas of other experimenting groups added.

In their essence, however, each of these systems may be regarded in their nature as closely approximating the so-called simultaneous systems. This is because of the fact that the information regarding detail in the scanned picture is sent continuously with the transmission method utilizing the broad principles which have become known in the art as the "mixed-highs." At the moment consideration in detail of the precise nature of the "mixed-highs" operation is unnecessary, since this is generally well known and the systems as a whole are described in the many papers included in the complete publication of the "Proceedings of the Institute of Radio Engineers," volume 39, No. 10, for October 1951, to which complete volume reference is herein made for the state of the art as it exists.

The same "Proceedings of the Institute of Radio Engineers" incorporates substantially the papers included within a published bulletin entitled "LB-841, Direct-View Color Kinescopes," published by Radio Corporation of America on September 7, 1951, for distribution to its licensees. Papers numbered as 4017 through 4027, inclusive, of the "Proceedings of the Institute of Radio Engineers" for October 1951, are substantial duplicates of the reports included in the mentioned bulletin of Radio Corporation of America.

In each of the so-called "RCA System" and the "NTSC System," hereinabove mentioned, the image detail is sent continuously in the higher frequency range of the bandwidth allotted to the transmission. Illustratively, assuming that the receiver amplifiers are generally flat to four megacycles, and that the permissible modulation range for transmission is of a bandwidth extending out from the main carrier on one side by substantially four megacycles (bearing in mind that vestigial sideband transmission is permitted on the opposite side of the carrier), the mixed-highs signals which represent the picture detail may be transmitted from some value intermediate 2.0 and about 4.0 megacycles. The Hazeltine Electronics Corporation, of Little Neck, New York, has demonstrated that even with color transmitted in the range between zero and 0.1 megacycle and the mixed-highs signals occupying, for instance, a band between 0.1 megacycle and 4 megacycles, reasonably good color television image reproduction can be achieved. Such facts are explained in the publication "Electronics," published by McGraw-Hill Publishing Company, in the issue for December 1950, volume 23, No. 12. To illustrate the effects of mixed-highs, the cover of the said "Electronics" publication showed a comparison of a simultaneous transmission of the color picture using a 12-megacycle video band and a mixed-highs transmission occupying a 4.2-megacycle band and the color information restricted to a band of only 0.1 megacycle. For transmissions of this type, illustratively, it may be regarded as if the high frequency components representing the picture detail are continuously transmitted and the low frequency components representing the color values (chroma) are transmitted in band-sharing fashion in the lower frequency portion of the allotted frequency band.

High fidelity color transmissions, such as are required for optimum operations, however, are generally regarded as more closely approached when the color signals occupy a greater portion of the allotted bandwidth for transmission than explained in the aforesaid "Electronics" publication. Accordingly, to illustrate the invention herein to be set forth it will be assumed that the mixed-highs are transmitted in the frequency range of between 1.0 and 2.0 megacycles up to approximately 4.0 megacycles. The lower frequency signalling frequencies representing the color (chroma) are then caused to occupy the lower frequency portion of the allotted band from a range of approximately direct current up to somewhere between 1.0 and 2.0 megacycles, depending, of course, upon the specific factors desirable for design and transmission.

Further, the present invention, as it will be set forth and explained, will be found to be applicable not only to each of the foregoing forms of system as proposed by Radio Corporation of America (RCA) and National Television System Committee (NTSC), but also applicable to the so-called segment-sequential system of transmission already outlined and explained in the presently copending applications for Letters Patent of the United States filed by the present inventors and identified as Serial No. 184,186, filed September 11, 1950, entitled "Color Television Apparatus," (now United States Patent No. 2,630,485, dated 3 March 1953) and the thereto-related application for Letters Patent of the United States, Serial No. 184,187, filed September 11, 1950, entitled "Color Television Synchronizing Apparatus."

Heretofore, as far as is known, color television transmissions have suffered generally because of distortions produced in the pictures due to the fact that it has been necessary (except for the field-sequential operations) to pick up the separate color images representative of the scene separated into its additive component colors by separate camera tubes, one tube being used to develop signals representative of each color component. Despite the fact that in camera apparatus it is possible to operate with considerably higher precision than is the case with receiver operations, where mass production is usually necessary, it is, nonetheless, a problem of great importance to provide the necessary precisely identical three separate images on three separate camera tubes, disregarding the fact that the electrostatic manifestations of these produced images must be scanned concurrently and symmetrically in order to achieve the desired signal transmission. To illustrate but a few of the difficulties of the prior art utilizing a multiplicity of separate camera tubes to select the separate color images, for instance, one for each of the red, the blue and the green color component images, it is necessary that the optical system be so designed that it registers the separate color images upon separate tubes in precisely the same size and with substantially precise focusing on each tube. It is also necessary if the transmission is to be free from distortions that the separate tubes be so controlled that when the output signals therefrom are developed as a result of scanning the electrostatic charge manifestations of the impinging image, the scanning in each tube always occurs homologously at precisely the same rate. It therefore is essential that not only must the tube geometry of each of the camera tubes be generally precisely duplicates one of the other, but also that the deflection control mechanism and circuitry be effective in precisely the same way upon each of the separate tubes. Any defects in the optical system result in conditions of parallax and out-of-focus which destroy the fidelity of operation. Any change in the relationship of the deflection operation in one tube with respect to another, or the effect of distorting fields on one tube to an extent greater than on some other tube, results in a combined output signal which is not a true representation of the scanned image, but, rather, includes distortions. Further than this, the cost of a camera and control apparatus using three camera tubes (each very expensive), the optical system for use therewith and control circuitry each of such precision as to approach practical operation, makes the installation cost of any adequate number of cameras for a color television studio almost prohibitive.

According to the present invention, all of these difficulties are obviated through the use of only a single camera tube for the purpose of image analysis and the development of the color television signals which are used at receiving points to re-create the transmitted signals into either color television images or black-and-white versions of the image. A camera tube of the same general type adopted for black-and-white (monochrome) operations is utilized in precisely the same form as that in which it is now operated to create the video signals from which the now-standardized black-and-white transmissions result (except for certain controls effective externally thereof, some signal channel modifications, and certain modifications of the optical system used to project an image of the scene upon the tube). Color television images are developed at receiving points (receivers, monitors, relays and the like) according to the present invention from such a single camera tube as a result of projection thereon of a single image of substantially the same size as would be employed were the camera tube to be utilized to produce signals from which a standard form of black-and-white operation would result.

From the standpoint of directing the image of the scene upon the tube, minor changes only are required. They are all external to the camera tube and involve, in the main, projecting the image of the scene onto the camera tube photo-sensitive surface through at least a color filter formed of a plurality of substantially parallel strips. Each strip is of one of the unsaturated colors forming the component or primary colors of a multicolor additive operation. Each color filter strip is preferably, and as an example of one form of the invention, of such width that when the image thereof is projected upon the light-sensitive element of the television camera tube to create the charge representations from which the image or video signals result, it is imaged in such a way that its width corresponds substantially to a width representing two-thirds that of one point or elemental area of the picture or scene as it is analyzed in black-and-white (monochrome) operations.

The reasons for imaging the filter strips to such widths will be explained in detail at a later point herein, but for the moment it may be mentioned that in tricolor operation, which is being used herein to explain the nature of this invention, it is desirable that the color cycle repeat at a frequency which is close to that representing the maximum which the system is capable of transmitting. Under the circumstances, a black-and-white (monochrome) operation would be such that for a four-megacycle pass band of the amplifiers the time period utilized to scan one point of the image would be one-eighth of a microsecond. Accordingly, in one quarter microsecond two image points can be scanned. However, for a tricolor operation, if the color repetition frequency is in the range of approximately four megacycles per second, it is necessary to develop three separate color versions in each one-quarter microsecond period to achieve the desired color repetition rate. Thus, in contrast, the two image points which would be represented by a black-and-white or monochrome picture each one-quarter microsecond the color operation is made capable of portraying approximately three separate color versions in the same time period. Consequently, the actual image filter strip widths are approximately two-thirds that of any one point of the black-and-white image as it is analyzed.

The lengths of the filter strips as projected upon the camera tube are at least equal to the height of the picture area to be scanned. Consequently, if a scanning operation occurs within the camera tube and the electrostatic charge produced as a result of response from the light-sensitive element of the tube to the image projected thereon is scanned in accordance with usual operations of a camera tube of the so-called image orthicon type, the successive scannings from point to point produce image (video) signals from which "mixed-highs" signals are developed as well as signals representing the image in its different component colors, such as the additive component or primary colors of red, blue and green, repeating in any selected and cyclic order.

By the proposal of the present invention, however, the color filter strips through which the image of the scene is projected upon the camera tube are all incompletely saturated areas so that they represent generally hues of the additive primary or component colors red, blue and green, with controlled amounts of white light added therewith. The addition of white light generally may be regarded as being similar for all of the various filters, so that each of the red, green and blue filters (assuming a tricolor operation) causes a certain amount of response from the photo-sensitive element of the camera tube in a manner generally like that which would result were the image projected thereon for black-and-white transmission operations. In addition, because of the fact that the color filters through which the image of the scene is directed to the light-sensitive element of the camera tube transmits one of the component colors at greater degree than the other two, the representation of the scene in its different component colors is accentuated from strip to strip in one of the several component colors. The result is that resting upon the pedestal formed by the concurrent activation of the target by light of all colors are accentuated response indications of the particular color of light most readily passing through the individual color filter sections.

This operation is such that from point to point on the photo-sensitive surface of the camera tube the accentuated response may be that of green, that of blue, or that of red (or any other selected order of these colors), after which the cycle will repeat. It thus appears that the detail in each of the component colors of the image as selected can be only approximately one-half, as a maximum, of that of the detail representative of the image in black-and-white. However, in view of the fact that it has been shown, both by demonstration and theory, that high-definition color pictures do not require high definition in each of the component colors, but merely utilize the color signals to supply the color information with the picture detail supplied by mixed-highs, it at once will become apparent that by properly selecting the color components from the picture signals, high fidelity color operations are achieved by the presently disclosed proposals.

This invention provides apparatus for accomplishing the foregoing objectives. It does so without the inclusion of any moving parts by imaging the scene upon the strip-like color filter and thence upon the camera tube. The color filter and the optical system are held in fixed position relative to the camera tube (except for permissible low frequency relative movement between the tube and the filter, or the optical system, occurring at an extremely slow rate of about five cycles per minute, as set forth in a concurrently-filed application for Letters Patent of the United States of the present applicants Serial No. 259,194 and entitled "Image Displacement Device for Television Cameras"). The rate of such movement is so slow that, as a practical matter, all elements may be regarded as fixed in position.

Since it is important in a transmission of this nature to establish a precisely uniform tracking or uniformity of movement of the scanning operation relative to the charge effects manifested by the different color filter strips as effective on the electrode member scanned, and which electrode member carries an electrostatic charge indicative of the light and shadow of the scene not only in black-and-white, but also in the component colors thereof, a tracking filter image (also in the form of strips of different light-transmitting characteristics) is also superimposed upon the photosensitive element of the camera tube in such a way as to occupy substantially the same area as does the image of the color filter and the image of the scene upon the photo-sensitive element.

A tracking filter in its broadest aspects has already been explained in the co-pending application for Letters Patent of the United States filed by the present applicants as Serial No. 184,186, heretofore mentioned. The tracking filter already disclosed included a plurality of strips individually arranged to accentuate the transmission of one light characteristic to an extent different from others. The light image of the tracking filter, in effect, is added to that due to the imaged scene upon the camera tube. Then, provisions are made to cancel any effect of the tracking filter from any developed signals so that the outgoing signal constitutes a true representation of the scene. A tracking filter might consist, for instance, of filter strips which are either transparent or opaque, or filter strips transmitting one of the primary or component colors into which the scene is analyzed or color filter strips transmitting any one of the colors complementary to the selected primary or component colors. It is within the concept of the present invention to utilize a filter of such nature, but for purposes of simplicity of operation, as well as explanation, and, above all, simplicity of manufacture, the tracking filter herein proposed may be considered as being one of a variety in which there are only two types of strips, one of which transmits light to a different degree or to a different extent than the other. As such, for purposes of illustration, one of the types of strips of the tracking filter may be a strip which is generally opaque and the other type may be a strip having transparency to all colors of light but to a minor degree, and thus constitute strips of the nature of gray, rather than opacities.

The strips of the tracking filter are also arranged as substantially parallel strips. They are preferably of such size (width and length) that when projected upon the photo-sensitive element of the camera tube along with the images of the color filter and the scene projected therethrough, each individual tracking filter strip occupies a width approximating that of each separate color filter strip and of substantially like length. With the tracking filter strips assumed to be alternately of zero and moderate light transmission characteristics, for example, and with the color filter strips being in a repeating cycle chosen in a selected order to include the colors red, blue and green, it will be appreciated that there is a general relationship of about three to two between the repetition cycle of the color filter strips and tracking filter strips, insofar as the projected image is concerned.

To make for simplicity of operation and to make more readily possible a selection of the tracking filter frequency and the color filter frequency, it is preferable to project the strips of each of the filters in such a way that their edges are substantially parallel. The filter strips of the color and tracking filters may be either superimposed or displaced, as desired. The important fact is that the tracking frequency be discernible from the scanned output signal.

As close to precise parallelism of the projected filter strips in the camera tube light-sensitive element as is possible serves to simplify operating circuitry of the tube, although it is to be understood that the proposal still functions even in cases where there is a lack of parallelism in the arrangement and the tracking filters in a projected state appear or are imaged on the photo-sensitive element of the camera tube in a slightly diagonal relationship to the strips of the color image filter. In either case, with scanning occurring within the tube, the tracking filter supplies or causes signals which provide information concerning the rate of motion of the scanning beam in the camera tube, just as readily as do the alined filter images but, as will be apparent from what is to be stated herein at a later point, complexities of circuitry may be introduced by such an arrangement.

Accordingly, as will herein be explained, the operation will be assumed to be characterized by substantially parallelly arranged filters, with the repetition cycle of the representative filters in the general range of approximately two to three for the color and the tracking elements. Under these conditions, where reference is made to "parallel" positioning it will be understood to mean either precise parallelisms or an approximate or substantial parallelism.

In one condition of operation the color filter strips may be selected in such width that in the scanning operation there are approximately 542 strips to the inch. The color repetition frequency will be at a rate of approximately 3.969 megacycles per second, as will later be explained, for standardized scanning conditions. It is practical to form the tracking filter with strips of approximately the same width as the color filter strips as they are projected upon the photo-sensitive element of the camera tube so that the tracking filter when projected on the tube causes the development along with the signal resulting from scanning of the image of a control frequency which is one and one-half times as great as that developed by the color filter.

It is, of course, possible to arrange the color filter strips and the tracking filter strips as they are imaged upon the tube in various patterns, as will be evident from the companion applications above identified, and as will become apparent also from a further companion application entitled "Camera Apparatus for Developing Signals for Color Television Operations." The present application, however, for purposes of simplicity of explanation, will refer to the relative positions of the color and tracking filters as being substantially parallel one with the other. As described in the mentioned applications, it will be assumed that the color and tracking filters are imaged upon the light-sensitive element of the camera tube so that when the images thereof are scanned (or the electrostatic charges resulting from the images thereof are scanned), the line-scanning operation occurs in a direction transverse to the long dimension of the filter strips. In the preferred operation, the transverse scanning direction approaches a path which is substantially normal to the long dimension of the filter strip, but it can be any transverse pattern that is feasible and which falls within the scope of the present disclosure.

Generally speaking, and assuming that the transmission band allotted to the color television operation is limited to a total frequency range of six megacycles, it is preferable that the color filter produce as a part of the signal output resulting from scansion within the tube a distinguishable frequency of some frequency value which may be termed *a*. The tracking filter should produce a second frequency which may be called *b*. The frequencies *a* and *b* for the six-megacycle type of operation may be considered as being non-harmonically related one to the other. They may also be regarded as being frequencies which are each a harmonic of a third frequency, called *c*. Any suitable values for these frequencies may be chosen, but for the purpose of illustrating the present invention, it will be assumed that the tracking frequency *b* is higher than the color repetition frequency *a*, and that the frequencies *b* and *a* are in relationships of the order of approximately three to two. From frequencies chosen in this range, that frequency initially proposed by the RCA group as a typical example of a color frequency, namely 3.58+ megacycles per second, may be utilized. Alternatively, the frequency of 3.89+ megacycles per second proposed by the NTSC may be developed. With scansion occurring at rates now standard for black-and-white, the herein-described color filter will illustratively be considered as having strip widths such that when the charge effects due to the color filter are scanned the color cycle will repeat at a repetition frequency of 3.969 megacycles per second.

On the assumption that a color repetition frequency of 3.969 megacycles per second is selected, the color filter strip is formed of a sequence or repeating cycle of strips chosen from the colors red, green and blue, and of a number of the general order such that with the optical system used, the strips appear as 542 per inch, as they are projected upon the photo-sensitive element of the camera tube. For an operation where the pictures are reproduced at the rate of 30 picture frames per second (60 picture fields per second of 262½ lines each and interlaced 2:1), the time to trace each picture line is approximately 63.5 microseconds. Allowing for the standardized 14% return line blanking period for each line scanned (as per present black-and-white standards), this means a usable line-scanning period of approximately 54.6 microseconds, within which time, for the assumed image width of 1.2" on the photo-sensitive surface of the camera tube, approximately 650 color filter strips (approximately 217 color cycles) are scanned. This provides, with a scene and the foregoing form and type of filters imaged upon the camera tube photo-sensitive surface to a size of 0.9" high and 1.2" wide (with a diagonal of 1.5"), a color repetition frequency of approximately 3.969 megacycles per second. This frequency herein used illustratively approximates that frequency value suggested by NTSC.

When the imaged scene focused on the photo-sensitive element of the camera tube causes the development of electrostatic charges which are scanned, the resultant signal outputs obtainable from the camera tube or its associated video amplifier include information concerning the scene or image focused upon the tube. With this video signal information there are also present signals from which an indication of the color filter frequency and the tracking filter frequency may be derived. The video signal information is also usually followed during the blanking period at the end of each scanning line by the line sync pulse and then signal information indicative of the color phase.

According to one form of the operation the tracking filter frequency is utilized by selecting from the camera output or from the camera video amplifier output the particular tracking frequency by way of a bandpass filter, for instance. Such a bandpass filter is arranged to pass an extremely narrow band of frequency. It peaks at the selected frequency for the tracking filter according to the system as it is designed. To provide a control over the scanning operation, this selected frequency is then discriminated against a stabilized and constant frequency of precisely the normal optimum tracking frequency to develop a control signal. The constant frequency is readily derivable from the usual sync signal generator. Through appropriate controls the discriminator output is caused to modify (if necessary) the scanning operation in the camera tube in such a way as momentarily to accelerate or decelerate the scanning beam in its scanning path transverse to the widths of the imaged filter strips to such an extent that substantially a precisely uniform rate of scansion is established. The companion application already mentioned, Serial No. 184,186, describes one form of arrangement to effect tracking.

Phasing operations are carried forward in a manner which will later be explained. From the standpoint of utilization of the remaining frequency band, the signal output of the camera or the camera video amplifier is then fed to a suitable form of tracking signal eliminator, which is preferably in the form of a band elimination filter.

For the purpose of assuming round numbers to explain, if it be assumed that the color cycle is 4 megacycles (according to the assumed example herein it will be 3.969 megacycles per second) and that a 2:3 relationship is maintained between the color and tracking filter control cycle, this will be provided by a tracking filter which produces a tracking control frequency of 6.0 megacycles (5.9535 megacycles per second for the assumed example). With this form of circuit any frequencies representative of the tracking information (which is to be used only at the transmitter end of the system) are eliminated from the outgoing signals.

In apparatus of the type herein set forth, it is important that the signal output from the camera (or the camera video amplifier) have removed therefrom these signal components representative of tracking information prior to utilization in any circuits to develop the "mixed highs" (detail) and color information components. It is recognized that the transmitter would cut-off such signal components from the output supplied to any therewith associated communication channel since the tracking frequency is higher than the maximum frequency passed, but reliance upon this effect would leave the tracking signal information included in the signals supplied to these circuits used to produce the "mixed highs" and color signals.

Signals minus the tracking filter information are then supplied to a unit which may be termed a pedestal suppressor. This unit may be in the form of a filter or an amplifier that has a controlled response providing an output at the color repetition frequency which is of sufficiently greater amplitude than the components of brightness in the picture, so that the proper ratio of the amplitude of the individual colors to the average value may be realized. The signals representing the complete frequency band minus the suppressed tracking filter frequency are supplied to a bandpass filter which is arranged to pass the upper end of the frequency range. Thus, for a four-megacycle system where the response is flat or substantially flat to frequencies of the order of four megacycles per second, this might be filter passing frequencies in the range between 1.5 and 4.0 megacycles. These signal outputs would constitute the mixed highs of the operation.

The signal output of the pedestal suppressor which includes the color information in which the representations of the various component colors each occur at repetition frequencies assumed to be in the general neighborhood of four megacycles each per second are then directed into a sampler or a modulator, to which is also supplied as a constant frequency or modulating frequency a sinusoidal wave occurring at precisely the desired color cycle repetition frequency (herein the assumed frequency of 3.89+ megacycles per second). By appropriate sampling or modulating, selection of the three signals indicative of red, blue and green is made by taking samples of the input signals each with 120° phase spacings on the sampling or modulating wave and limiting (preferably) the sampling period to approximately 10% to 20% of this period. By feeding these selected frequencies into three separate filters, each of a low pass variety, passing frequencies between substantially direct current (D. C.) and some frequency value less than the color repetition frequency, it is possible to derive from each filter the output of one of the selected component colors. Because the low pass filters have a cutoff frequency which is less than that at which the sampled color information supplied to them, the output effect is as if a continuous signal indicative of the color in question were supplied continually to the input. In practice, and in order that mixed highs shall be excluded from the color channel, these filters are usually arranged to cut off at an upper frequency of about 1.0 to 2.0 megacycles per second.

With the foregoing generalized description of the invention having been set forth, it will be appreciated that one of the objects of the present invention is that of providing a color television scanning apparatus wherein images may be projected upon a single camera tube only, so that with scansion in the camera tube following normal procedures it is possible to derive from that single camera tube signal information indicative of both the high detail in the picture, this being in the form of signals of the so-called mixed-highs variety, and signal information represented as being continually present and indicative of the color values in the same scene as it is scanned.

Another object of the invention is that of providing color television apparatus wherein a single camera tube produces signals representative of each selected component color of a multicolor operation so that all optical distortion effects that would be present in multiple tube cameras are eliminated.

Still other objects of the invention are to provide color television apparatus wherein the camera tube as used to translate the scene imaged thereon will produce signals from which the replica may be developed at the suitable points of reception such as receivers, monitors, relays and the like, may be in either black-and-white or color, and with substantially equal detail in all respects and without introducing any observable flicker effects, whether between fields, lines, portions of lines, or dots from which the lines are composed.

A further object of the invention is to provide a simplified form of transmission apparatus from which signals indicative of both color and black-and-white may be developed, and in which the operation is considerably simplified over any form now known or proposed.

Other objects of the invention are those of providing from television apparatus wherein the image point analysis is made substantially sequentially from one point to another in a series of cyclically repeating colors a simultaneously present low frequency version of the image in each of its component colors and concurrently therewith developing signals representing as a black-and-white version or as mixed-highs the picture detail.

Other objects of the invention are to provide simplified forms of color analysis which will, nonetheless, insure high fidelity operation and which analysis will develop signals from which transmission operations can be carried forward according to any of the presently-proposed forms of compatible operations of the so-called dot type, as advocated by Radio Corporation of America, the band sharing simultaneous types advocated by the National Television System Committee, and the segment type already proposed by the present applicants.

Other and further objects of the invention will become apparent from a consideration of the following specification and its claims, particularly when read in connection with the accompanying drawings, wherein:

Fig. 1 schematically represents a form of color filter suitable for use in connection with the invention, it being understood that the representation is purely schematic and in no way intended to be drawn to scale, but merely to represent a series of substantially uniform width strips arranged in a cyclically repeating group of filter sections each of one of the unsaturated component colors of an additive multicolor;

Figures 1, 2, 3, 4:
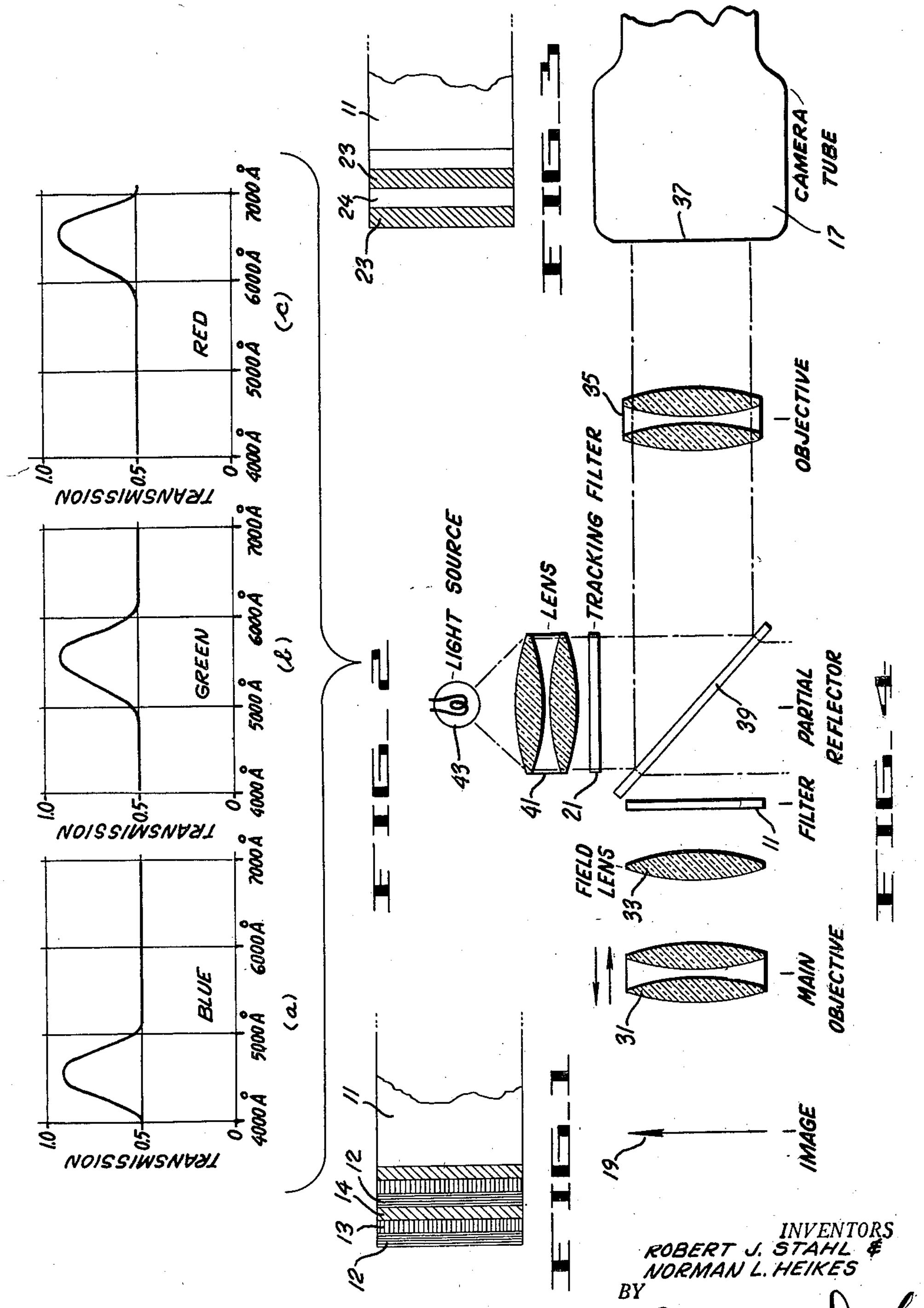
Fig. 2 represents by its three curves (*a*), (*b*) and (*c*), schematically, the light transmission of the blue, green and red filters, respectively, in reference to wave lengths and percent transparency.
Fig. 3 is a schematic representation of a tracking image filter section also in no way indicative of being drawn to scale, but merely to represent a repeating cycle of alternate filter strips of different light transparency.
Fig. 4 is a schematic showing of the optical system and filter arrangement for directing an image of a scene upon a television camera tube light-sensitive surface.

Referring now to the drawings, the color filter 11 depicted in Fig. 1 preferably consists of a plurality of substantially parallel filter strips formed, illustratively, as red transparencies 12, blue transparencies 13, and green transparencies 14, repeating, in the illustrated example, in a color cycle designated as red, blue, green. Preferably, the filter strips occupy an area in which the length of the filter strips corresponds generally to three units, whereas the combined width of all of the several filter strips collectively totals four units. This provides the desired 4:3 aspect ratio in the final picture.

The red, blue and green filter strips 12, 13 and 14 are each of a width such that when projected upon the light-sensitive element of the camera tube 17 (see Figs. 4 and 6) they can be focused to a width corresponding to approximately that of one elemental area, into which the scene or image 19 (see Fig. 4) is projected upon the camera tube. The filter strips preferably are unsaturated, so that hues of the different component colors of a multicolor, such as the red, blue and green customarily considered as the primary or component colors of a tricolor additive system transmit light wavelengths of the characters generally shown by the three curves of Fig. 2. It will be observed that there is a certain selected transmission in all light wavelengths (illustratively, wavelengths between 4000 A. and 7000 A.) to a selected extent. A relative transparency to all colors in the range of about 50% is adequate, although for some conditions of operation a lesser transmission or a slightly greater transmission of light of all colors may be preferable. Ordinarily, for the blue filter, the transmission in the region of blue-light wave-lengths is considerably greater, as is the case in the green range, for the green filter, and in the red range for the red filter. The extent to which the different filters pass more readily the particular component color of blue, green or red, can, of course, be controlled and utilized to provide a high degree of color fidelity and a favorable signal-to-noise ratio and, in addition, to establish an immunity to spurious patterns.

The manner of constructing the color filter 11 is not specifically a part of this invention. One suitable form of constructing the filter has already been set forth in the companion application for Letters Patent of the United States of the present applicants, Serial No. 184,186, to which reference has already been made. However, reviewing in brief this general construction, the filter is preferably constructed by outlining the colors with great precision on a large master copy which can be reproduced. In this way the relative sizes of the filter strips can be very accurately portrayed, as well as their colors. The master is then suitably photographed on a suitable photographic film or plate, such as that known in the art as Kodachrome, in order that a copy thereof of a usable size may be provided. By suitable selection of the optical system, the image of this filter may either be enlarged, reduced or focused in a 1:1 relationship on the light-sensitive element of the camera tube.

The tracking filter later to be mentioned herein may also be formed in similar manner, with the exception that if the filter strips of the tracking filter shall be chosen as transparencies and opacities, the reproduction on color film need not be made, and an ordinary photographic film or plate is adequate for the purpose.

Making reference particularly to curve (*a*) of Fig. 2, it will be seen that the filter which is proposed primarily to develop the blue component color has a high transmission in the blue range of between 4000 A. and 5000 A., for instance. There is, however, some transmission in all wavelengths of light between the blue and the red or the near-infra-red. The curves for the green and the red filters appear to be self-explanatory, in the light of the foregoing, and need not be further discussed.

Fig. 3 sets forth what may be considered to represent schematically either a color phasing filter or a color tracking filter. Considering the showing as a color tracking filter, the drawing represents the element on an exaggerated scale relative to the color filter suggested by Fig. 1. As a color phasing filter, the relative proportions of Figs. 1 and 3 are approximately correct. Filters of such characteristics are provided in order that there may be derived from the signal output of the camera tube as a result of scansion therein signals indicative of the phase at which the scanning operation is occurring (for the color phasing filter) and signals at the rate at which the scanning operation is taking place (for the color tracking filter). The color phasing filter may be formed at the edge, say the left edge, of either the color filter 11 or the tracking filter 21. This is for conditions where it is used following line blanking. For use after field blanking, the color phasing filter section may be formed above or below the color or tracking filter.

The phasing filter comprises alternate strips of different light-transmitting characteristics, as does the tracking filter. Hence, bearing in mind the fact that the proportions may be different for each of these filters, one form of illustration only has been utilized. The reason for the strip width differences between the tracking and phasing filters comes about because of the fact that the tracking frequency to be developed, as already suggested, is made higher than the color repetition frequency, and hence, with the assumed 3:2 relationship between the tracking frequency and the color repetition frequency, it can be seen, for instance, that there will be three sets of alternate strips of the tracking filter which will produce a control on the output signal over the same period of time allotted for scansion as would be occupied by two sets of color filter strips of the selected repeating sequence for each set of red, blue and green. With respect to the phasing filter, however, it is desired that the frequency developed shall be like that of the color cycle, so that the strips of different light transmission characteristics, illustratively the opaque strips 23 and the transparent strips 24, shall, together, assume a width such that when projected upon the camera tube light-sensitive target they shall occupy a width corresponding to that of three color strips, namely the strips 12, 13 and 14.

In the scanning operation as normally carried forward, the operation is usually such that there is a slight overscan of the normal picture area. The color phasing filter is usually imaged upon the camera tube target to occupy thereon that portion which would be included in the overscan range so that it extends out beyond the picture for a short distance. Because of the small width of the strips, this small distance is actually only a few hundredths of an inch, but is adequate for the purpose intended.

In one form of assembly, the color phasing filter as utilized is imaged to occupy a width on the camera tube photocathode of about 0.004". Each filter strip in the assumed example is approximately 0.0028" when imaged upon the photocathode tube area. This means that the color phasing filter strips occur with a spacing of about 362 to the inch, but as they are imaged upon the photosensitive cathode there are only enough strips to provide about seven cycles of signal representing the phase condition. The frequency of this signal corresponds to the color cycle.

The tracking filter itself, and neglecting the possibility of the color phasing filter on its left edge, preferably has its strips (generally of opacities and transparencies) of approximately the width of the strips of the color filter itself. In the illustrated example, this would mean that the alternate strips of the tracking filter are arranged at approximately 542 strips to the inch, which means that the individual strips are approximately 0.0018" wide when projected upon the photo-sensitive element of the camera tube.

From what has been stated above, and in the reference made to the width of the various filter strips, it has been desirable to consider the relative size when finally projected upon the camera tube. Where there is a 1:1 relationship in the size of the actual filter and the image of it on the photo-sensitive area of the camera tube, of course the actual filter is formed in the same size. Where there is a reduction in size due to the optical system of the image of the filter as it is produced upon the photo-sensitive element of the camera tube, of course the filter strips in the actual filter may be larger in proportion to the size reduction in the image. It is completely dependent upon the optical system. The significant features are, however, that the light of the imaged filter area when reaching the camera tube preferably is projected to widths of those mentioned, and of lengths corresponding essentially to at least the height of the picture area scanned.

To achieve these results, the image of a scene represented conventionally at 19 is projected by a main objective lens 31 through a suitable field lens 33, which serves to bring the rays essentially into parallelism so as to focus upon the color filter 11. The image of the scene as viewed through the color filter 11 is then focused by means of an objective 35 upon the light-sensitive end 37 of the camera tube 17. It has already been explained in the co-pending application for Letters Patent of the United States of the present applicants, Serial No. 184,186, that the field lens 33 is positioned immediately adjacent the multiple-strip color filter element, herein 11. The field lens is preferably a Fresnel type, and directs the light from the main objective lens 31 into the second objective lens 35. The Fresnel type field lens 33 need not be of an especially high quality, since it actually does not contribute to the image formation, but the type chosen should preferably be selected as against a standardized converging lens in order to avoid the introduction of serious Petzval curvature effects. The steps in the Fresnel lens should be sufficiently shallow to provide negligible shadowing in the image.

Between the field lens 33 and color filter 11 and the second objective 35 there is a partially reflecting mirror 39. This mirror 39 is located in the optical path of the light from the main objective 31 through to the second objective 35 and the camera tube 17, and positioned therein, for example at an angle of 45° to the axis of the main objective 31 and the optical axis of the tracking filter 21. Other angles may be used where desired. This partial reflector 39 may have any transmission range between one-half and that maximum value at which it will reflect the minimum amount of light directed thereon from a path originating on the surface side toward the multiple-strip color filter 11. For simplicity of explanation, however, it will be assumed that the partially transparent reflector or mirror 39 is a half-silvered surface, although in some instances, as was pointed out in the companion application of the present applicants, Serial No. 184,186, the reflection from a plain sheet of glass may be adequate.

The tracking filter 21 is arranged adjacent a lens element 41 which receives light of generally constant value from a source 43. The optical axis of the lens 41 which passes through the tracking filter perpendicularly to the plane of the tracking filter is so located in the illustrated example that it meets the plane of the partial reflector or mirror 39 in a direction 45° thereto, and in a direction normal to the optical axis of the main objective 31. The optical path length from the objective 35 to the plane of the tracking filter 21 is preferably the same as to the color filter 11.

Any light representing a scene or image 19 which is directed through the main objective 31 to the camera tube to focus upon the color filter 11 and thence into the second objective 35 will be representative of the image broken into its separate colors insofar as the transmission characteristics of the filter 11 are concerned. Light losses depend, of course, upon the transparency of the partial reflector 39 arranged transverse to the optical axis of the main and second objectives 31 and 35, respectively. At the same time, because of the illumination of the tracking filter 21 by light from the source 43 passed thereto by the lens 41, the image of the tracking filter is concurrently projected upon the photo-sensitive area 37 of the camera tube 17 by reason of some of the light of the tracking filter image being reflected along the optical axis of the second objective from the partial reflector 39. The fact that some of the light of the image 19 and the color filter 11 is lost, due to reflectance from the partial reflector, and the fact that some of the light of the tracking filter image is lost due to transmission through the partial reflector 39 is in no way critical except as it reduces the amount of light reaching the tube 17. However, such light of the image 19 and the color filter 11 as is transmitted through the partial reflector 39 and that light of the tracking filter 21 which reflected from the partial reflector 39 combine along the optical axis of the objective 35 and are focused upon the photo-sensitive end of the camera tube 17 by this second objective. The color filter 11 and the tracking filter 21 and the optical components associated therewith, such as the field lens 33, the lens 41 and the second objective 35, are all fixed in position one with respect to the other. They form a supplementary optical component which is interposed between the main objective and the camera tube 17. The main objective is indicated as being movable in two directions along its optical axis for the purpose of focusing the image 19 first upon the filter 11 and thence upon camera tube by way of the second objective 35. The operation of the optical system is such that precise and accurate functioning is obtained with this arrangement of components located in stationary relationship one to the other.

Figures 5, 6:
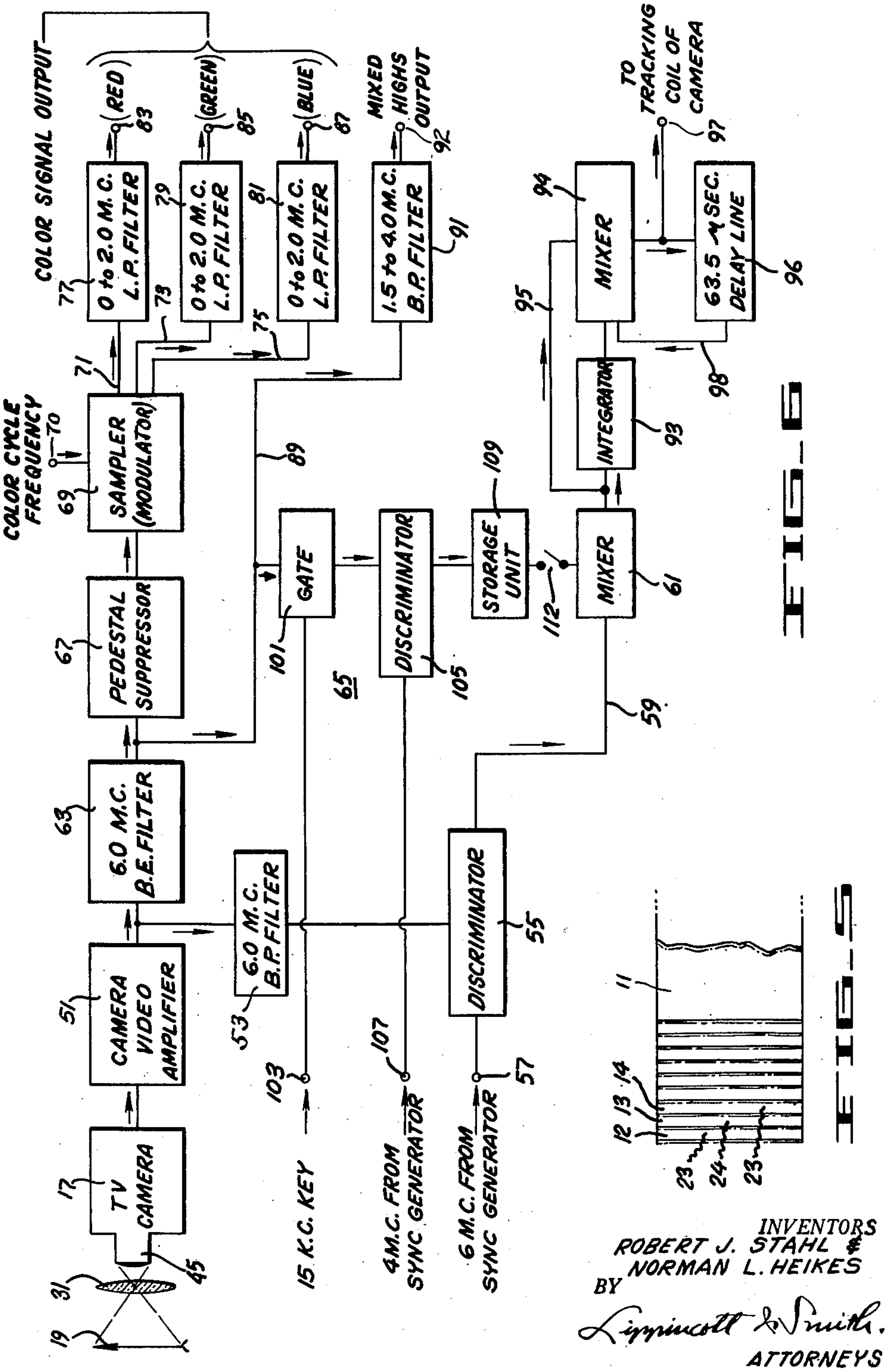
Fig. 5 is a schematic representation, likewise not to scale, of the superimposed color and tracking filters as they are projected upon the light-sensitive element of the television camera tube.
Fig. 6 is a schematic circuit block diagram of suitable circuitry for controlling the scanning operating and image analysis within the camera.

Under the foregoing proposals, the images of the tracking and color filters, when superimposed upon the light-sensitive end wall 37 of the camera tube 17 may have a general appearance such as that conventionally illustrated by Fig. 5. In Fig. 5, the color filter and tracking filter are shown as having strips which are just slightly displaced one from the other. This provides a clearly workable operation, but any fixed displacement can be used. The showing in Fig. 5, therefore, has been made solely to make for clarity in indicating the fact that the two filter images are superimposed. As the strip widths of the color and tracking filters are such that in projection upon the camera tube light-sensitive area they are focused to like widths, it can be appreciated that the repetition frequency bears a relation of 2 for the color filter to 3 of the tracking filter with respect to the total number of strips required to make up each repeating cycle.

With these thoughts in mind, reference may now be made to Fig. 6, which diagrammatically illustrates one form of control apparatus for operating the camera tube arrangement herein proposed. The image of the scene 19 is directed by the main objective 31 into the camera tube 17. In Fig. 6, the box-like end 45 of the camera conventionally represented is intended to include all of the field lens 33, the color filter 11, the partial reflector 39, the objective 35, the tracking filter 21, the lens 41 and the light source 43, and the camera tube itself, which are collectively designated by the numeral 17, as in Fig. 4.

Scanning occurs in the camera tube according to well known principles, but, for illustrative purposes, it may be regarded as if the camera tube 17 is of the type known in the art as the image orthicon, and that the output signals result therefrom in known manner. The scanning beam within the tube is deflected bi-directionally to scan the target area upon which a charge manifestation is developed to represent the light reaching the photo-sensitive element (photo-sensitive electrode target or cathode) of the tube. The signals so developed are then appropriately amplified, usually partially directly within the tube in an electron multiplier section thereof, and thence later amplified in a camera video amplifier represented at 51. The camera video amplifier has a very flat characteristic and amplifies signals indicative of the scene imaged upon the photo-sensitive element of the camera tube and also the filters concurrently imaged thereon. There accordingly appears at the output of the camera a signal which is in the nature of a composite indicating the information of picture detail, the color information, the frequency at which the color information is being developed for each point of the picture, information comparing the rate of tracking of the scanning beam with respect to the traverse of each picture line and at the beginning of each line (or the termination of each line, depending upon how the operation is viewed) and signals indicative of the phase of the scanning operation, this, accordingly, emphasizes the importance of the camera video amplifier having a flat response characteristic for a rather wide frequency band. If, for instance, it be assumed that the color cycle repeats at some repetition frequency approaching 4 megacycles per second, which generally is presently regarded as being the response limit for the average receiver amplifier, and as being a frequency which generally is unattenuated in the transmission operation, and if it be assumed also that the tracking operation occurs at once-and-a-half the frequency of the color cycle repetition rate, then it can be appreciated that it is desirable to have the camera video amplifier substantially flat or uniform in its response for frequency values of approximately direct current (D. C.) through and including 6 megacycles per second. Preferably, the camera video amplifier should be flat, even a little further than the minimum for which the system is designed. The amplifier per se is well recognized in the art, and, accordingly, so long as the response characteristic covers the range and that suggested, any general form of amplifier is satisfactory. Hence, the illustration of this feature of the invention is purely schematic and the block form is justified.

At the output of the camera video amplifier 51, a connection is made to a bandpass filter 53. On the assumption that the color repetition cycle is approximately 3.969 megacycles per second, as hereinabove suggested, and on the assumption that the strip widths of the tracking filter as imaged upon the camera tube correspond to those of the color filter, the bandpass filter 53 will be arranged to pass frequencies of one-and-one-half times that of the color cycle. These represent the tracking filter frequency which herein may be assumed to be approximately 5.9535 megacycles per second. For purposes of simplicity of explanation, this frequency value is designated on the drawing as being 6 megacycles, as a round number designation of the tracking frequency, since it illustrates, principle-wise, the problem involved.

The bandpass filter 53 is so designed as to pass a rather narrow band of frequencies of the selected range. The output signals at the selected frequency which now exclude the video frequencies, and information concerning the color cycle and the phase thereof, are supplied to a discriminator 55 of any standard form. The discriminator is also supplied with signals at an input terminal point 57, in accordance with a selected output from a suitable sync signal generator, not shown. The input signals available at the terminal 57 are designated on the drawings as being 6 megacycles per second. Here again it is pointed out that this frequency is illustrative, and that the actual frequency impressed should be that frequency at which the tracking signals are developed. Under the assumed condition, the 6 megacycle input at the terminal 57 actually will be signals repeating at a frequency of 5.9535 megacycles per second. Accordingly, since the input signals at the terminal 57 are of constant value as a result of the precision of generation in the sync signal generator of the system (not shown), any variances between these signals insofar as either frequency or phase is concerned will be detected by the discriminator and become available in well known manner on the output conductor 59, so as to be supplied to a mixer 61. The voltage input to the mixer 61 from the conductor 59 then is a measure of either the frequency or the phase between the tracking filter frequency actually developed within the camera tube 17 due to scansion and an optimum rate at which the scanning operation should occur. In accordance with this control a modification or instantaneous correction of the scanning rate may be established in a manner later to be described.

With the foregoing features of tracking in mind, it now is desirable to consider the signal output from the camera and its video amplifier 51. Signals of the character included in this portion of the system, as explained in connection with those supplied to the 6.0 megacycle bandpass filter 53, include all frequencies generated by scanning, as well as the tracking frequency and the frequencies representing both the color cycle and the color phasing information (although it must be borne in mind that the color phasing information occurs in the portion of the line scan wherein blanking would actually occur in the receiver instrumentalities, so that this information as developed in the camera will not be transmitted). Information concerning the color phasing is transmitted according to the proposal herein set forth by developing in the sync signal generator a frequency of the particular value chosen for the color cycle which, in this instance, is 3.969 megacycles per second, and this selected frequency is then added into the outgoing signal in a manner analagous to that in which the line sync pulses, the equalizing pulses and the vertical sync pulses are added. The timing is controlled so that signals indicative of the color phase as supplied from the sync signal generator are added during the so-called "back-porch" of the line sync, and during blanking and prior to the retransmission of the video information.

The normal type of video transmission would not transmit signal frequencies as high as those herein proposed for the provision of tracking information. However, because of certain optical effects which might result in the reception of images and because the viewer would sense the presence of signal frequencies much in the nature of a beat between the tracking frequency and the color cycle repetition frequency (appearing as a moire) it is desirable to remove all information occurring at the tracking frequency prior to utilization of video signals developed to provide information both as to mixed-highs and the separate component colors. Tracking signal information is removed from this form of combined signal above described by the use of a band elimination filter identified on Fig. 6 as the 6.0 M. C. B. E. filter. This filter actually peaks, insofar as the removal of the signal is concerned, at the assumed tracking frequency of 5.9535 megacycles per second. A filter of this character then removes from the combined signal those frequencies which occur at the selected value, in this instance the tracking frequency, and the output from a filter of this type then may be supplied to two parallelly connected signal paths, of which one path, generally designated at 65, includes circuits which will later be described, but which, at the moment, may be considered to provide a phasing control on the one hand by use through a gate circuit during the blanking period and on the other hand to provide the mixed-highs during the useful transmission periods. The second path will be utilized for the purpose of removing the so-called pedestal, introduced into the video signal by reason of the unsaturated state of the color filters.

The pedestals are suppressed in the pedestal suppressor 67 which will later be described.

In connection with the band elimination filter 63, no reference has so far been made to the fact that this may, if desired, provide elimination of what would correspond to any beat frequency developed between the tracking frequency and the frequency of the color cycle. The beat frequency would be a frequency of the order of 1.98+ megacycles per second and removal thereof is by known methods of filter design to suppress some particular frequency. The amplifiers are, however, made as linear as possible, and furthermore, in view of the fact that any moire effects are inherently optical rather than electrical, it is usually unnecessary to provide for suppressing frequencies in the range of what might be considered to constitute the beat frequency of 1.98+ megacycles per second. If desired, however, it is to be understood that the filter 63 may be assumed to include such frequency elimination.

It is to be noted that if frequencies of the last-described values are eliminated, the effects upon the final electro-optical image re-created at monitoring and receiving points is negligible. This is because of the fact that it is usual practice at the present time to provide the mixed-highs signals in the frequency range such that this assumed beat between the tracking frequency and the color cycle repetition frequency is generally near the cross-over between the highest frequencies allotted to color information and the lowest frequencies allotted to the mixed-highs information.

In some instances it may prove desirable to modify the circuitry to the extent that the component 63, in contrast to being in the nature of a 6.0 megacycle band elimination filter, operates in such a way as to suppress the camera tracking filter frequency. One convenient way to accomplish this result is to feed some of the output from the 6 megacycle bandpass filter 53 used to select the tracking filter frequency back to the tracking signal eliminator component and there to mix it with the output of the camera and the camera video amplifier. The mixed signals must, however, be combined in such phase that the signal information occurring at the tracking filter frequency, as derived from the bandpass filter 53, is applied or mixed with the combined signal output from the camera video amplifier 51, so that the tracking filter information in each of the two signals is 180° out of phase. To this end, it is usually desirable to provide, in addition, a phase control circuit intermediate the tracking signal attenuator and tracking frequency bandpass filter.

The net effect of this circuit modification is substantially the same as eliminating the band of frequencies in the region of the tracking filter frequency directly by way of a band elimination filter, as particularly shown by Fig. 6.

The signal output from the band eliminator filter 63 from which the color information is to be derived is supplied to the pedestal suppressor 67. The pedestal suppressor 67 is a component such that it functions to attenuate all frequency components of the signal output of the tracking signal band elimination filter 63 which are of a lower frequency value than the assumed color cycle repetition frequency. With the assumption that the color cycle repeats at a frequency of 3.969 megacycles per second, the output from the pedestal suppressor will be accentuated in the frequency range corresponding to that of the color repetition cycle, effectively resaturating the colors which have been revealed to the camera tube as unsaturated color components through the color filter.

Considering now, for instance, the transmission characteristics of the various filters depicted by Fig. 2, it will be observed that the transmission of all of the filters is shown as at least 50% for light of any color. Above this value the transmission is accentuated for light of the color of the particular filter chosen. With the filter strips of the color filter 11 repeating in such locations on the light-sensitive element of the camera tube that the color cycle is the selected 3.969 megacycles per second, if the pedestal suppressor includes one path in the form of a high pass filter (passing primarily the color repetition frequency) and a path in parallel therewith in the nature of a low pass filter (passing frequencies below the color repetition rate) and an attenuating means in series therewith the outputs of the two separate parallel paths may be combined in any desired form of mixer.

In the path including the high pass filter, it can be assumed that for a picture or scene 19 projected into the camera tube having various component colors present, the output from the high pass filter will be in the form of a sine wave having a frequency of the color repetition frequency and an amplitude determined by the difference between the particular primary or component and the other two chosen primary or component colors. Sine waves of precisely like frequency shifted in phase 120° (electrical) from each of the other two colors will be available at the output of such a high pass filter, it being borne in mind that the output is, of course, the vector sum of all three separate sine waves displaced 120° relative to each other (but in general differing in amplitude).

In the parallel path comprising the low pass filter there will be representations of the low frequencies which, referring to the curves of Fig. 2, represent the picture minus the color components occurring at the assumed 3.969 megacycles per second color repetition rate which latter components represent the picture color (chromaticity). Such a signal as would pass through a low pass filter of this nature may then be attenuated to any desired degree, so that when combined with the output from the assumed 3.969 megacycle high pass filter, the color signals (which of themselves are generally in the form of a sine wave) are so shifted in vertical position that the produced sine wave passes through a zero point in any desired relationship.

In a preferred operation the attenuated output from the low pass filter is combined with the sine wave output of the high pass filter in such a way that (assuming a pure primary color) it acts upon the signal produced from the camera tube in such a way that the resultant sine wave passes through a reference base 120 electrical degrees before and after reaching its crest value.

The foregoing explanation is in the nature of a specific illustration of one form of the operation, but it should be understood that the fundamental procedure which is being considered at this point is that of restoring the color component to a condition which would have been represented as the output of the camera tube had the strips of the color filter each been pure primary colors, rather than of the unsaturated primaries herein assumed and utilized (as will be more particularly apparent at a later point) in order that the mixed-highs may be derived from the camera tube output signals.

The high pass filter, considered in conection with the pedestal suppressor, has been mentioned above as being one of a high pass variety which passes the color repetition frequency herein assumed as 3.969 megacycles. However, to improve color resolution, a filter of this type should be one that is fairly broad in its response in order that it will pass sidebands of the color repetition frequency.

While the pedestal suppressor of the form described in what has been stated in that portion of the specification immediately preceding is one of the preferred forms of apparatus to derive the color signal alone from the composite signal, the circuitry to achieve the desired result may have some modification. In an alternative proposal, the pedestal suppressor may comprise two parallel inputs to an adder circuit. The adder circuit in one form may comprise two pentodes having separate inputs with a combined and common output. The separate pentodes preferably provide gain. The signal input to one of the pentodes would be that supplied from the output of the 6 megacycle band elimination filter 63. The input to the other of the pentodes would be the same signal output from the band elimination filter 63, after that signal has been passed through a high pass filter which permits the passage of signal frequencies of the order of the color cycle repetition frequency and selected sidebands associated therewith. Suitable phase control may be provided in at least one of the parallel paths if desired or necessary to high fidelity operation. The output of the adder then will furnish the signal input to the sampler or modulator 69 in the same manner as the previously-described circuit components.

The signal output from the pedestal suppressor is then supplied to a component 69 which may be regarded as either a sampler or a modulator. The sampler or modulator 69 is essentially an electronic switch arranged to connect in sequence to three different outputs herein schematically represented as the output terminals or conductors 71, 73 and 75. Normally the output from the sampler, modulator or commutator 69 could be regarded as effective for 120° of a controllable sampling frequency; however, for the purposes of this invention, it is usually preferable to confine each of the usable output periods of the sampler or modulator to limited ranges of between 15° and 20° (electrical) of any controllable sampling frequency.

The sampler or modulator 69 may, accordingly, be regarded in the general nature of an electronic switch or commutator of well known variety, the operation of which is synchronized or controlled by an input frequency which corresponds to that of the color cycle which is applied separately from an input terminal point 70. In the present instance, for diagrammatic illustration on the drawings, this is indicated as a four-megacycle signal which is applied from the standard sync generator (not shown) of the transmitter. Actually, the input frequency of the color cycle selected at 3.969 megacycles per second is of this last frequency. It is, of course, accurately stabilized in its frequency value. Under the above circumstances, the input signals to the sampler or modulator as derived from the pedestal suppressor 67 are arranged to be distributed by the electronic switch or commutator under the control of the switching operation synchronized with the color cycle.

By appropriately biasing the commutating system to such bias values that the commutator passes an output signal only at selected amplitudes of the control frequency wave, it can be appreciated that the various outputs as effective on the conductors 71, 73 and 75, respectively, are, as it were, samples of the color signals with the samples restricted to narrow portions of the sampling wave. Since each of the signals representing each color repeats at the color frequency of 3.969 megacycles per second, a frequency of this nature is present on the conductors 71, 73 and 75.

These signals are applied to separate low pass filters 77, 79 and 81. Each of the low pass filters 77 through 81 is arranged to pass frequencies ranging between approximately zero (direct current) and approximately 2 megacycles per second (or even slightly lower). Accordingly, in well known manner, with the input signals to the low pass filters 77, 79 and 81 each occurring at a frequency approaching 4 megacycles per second, it is evident that the outputs derived from the filters and available at the output terminals 83, 85 and 87, respectively, for the assumed component colors red, green and blue, respectively, are all continuous signals. As such, the signals indicative of each separate color will be concurrently present and capable of utilization in any selected fashion. Thus, in accordance with established principles in the art with respect to color television operations it is apparent that the herein described invention is applicable to various forms of operations, as above inferred. This is because there is also concurrently present a signal output representing the mixed-highs. These signals are derived by taking a second portion of the output of the 6 megacycle band elimination filter 63 and supplying these signals through a conductor 89 to a bandpass filter 91. The filter

91 is arranged to transmit a frequency band varying in the range between about 1.0 and 4 megacycles per second, and, as such, it will provide signal output in the high frequency range and thus provide representations of the picture detail.

Up until this point in this description, only brief reference has been made to the control of the tracking operation. It has been pointed out that the 6 megacycle bandpass filter 53 selects the tracking frequency from the camera video amplifier output. The tracking frequency, herein assumed to be 5.9535 megacycles per second, is discriminated against a stabilized input of the same average frequency fed to the discriminator 55 from the terminal point 57, with the control frequency having been supplied by the sync signal generator of the transmitter. The signal output from the discriminator 55, representing the error signal, is supplied through conductor 59 into the mixer 61, the function of which will be ignored for the moment. The output of the mixer 61 is passed through an integrator circuit 93, in the form of a low pass filter of long time constant, into a mixer 94. The same output from the mixer 61 is also supplied directly to the mixer 94 by way of the conductor 95 in such a way that it bypasses the integrator. The output of mixer 94 is supplied to a delay line providing a delay of one line scanning period, which is equal to approximately 63.5 microseconds. The same output from the mixer is also supplied to a terminal 97, which is then fed to the tracking coil of the camera 17, as set forth in application Serial No. 184,186. The output from the delay line 96 is fed back also to the mixer 94 by way of the conductor 98.

In this fashion, the output from discriminator 55 which indicates any departures in the tracking rate from optimum is supplied to the mixer 94 as output from the mixer 61, and also to the same mixer 94 through the integrator 93, which integrates the signal over a relatively long period of time. The result of this mixing operation is indicative of the averaged control. The integrator circuit 93 has a long time constant, so that it can provide a correction effective substantially from field to field. It thus may be regarded as a component having "memory" of the preceding field. Similarly, the delay line 96 will provide what may be regarded as a "memory" of the preceding line scanned. The direct connection between the mixer 61 and the mixer 94 through the conductor 95 provides an instantaneous connection to indicate the conditions obtaining at the moment. Accordingly, the mixer 94 is supplied with a signal representing the instantaneous condition (as from mixer 61) and a signal representing the condition of the preceding field (as from integrator 93), as well as the regenerated signal representing the preceding line (as from delay line 96). Consequently, the net effect is that at the output of the mixer 94, as available at terminal 97, for instance, there is a signal from which a control of the voltage in the tracking coil of the camera may be readily established. Broadly speaking, the output from the terminal 97 should not be supplied to the deflection coil of the camera tube in common with the deflection tube output circuit. It is usually preferable to provide a completely separate tracking coil of an adequate number of turns, so that the minor corrections may become effective. If this is not done, then the correction effect should preferably be supplied by tapping into the main deflection coil. Generally speaking, these features of the control exercised by way of the tracking coil have been set forth in the copending application for Letters Patent of the United States of the present applicants, Serial No. 184,186.

It has already been mentioned that at the edge of either the tracking or the color filter, a series of strips is provided to indicate the phasing conditions. These strips are preferably of a nature like those shown particularly by Fig. 3, so that they are formed as opacities or transparencies. Where the strips to indicate phasing are to occur precisely at the frequency of the color scanning, the strip widths are made such that two strips, i. e., one opaque and one transparent, occupy a width on the photo-sensitive area of the camera tube which corresponds to that of three color filter strips. In this sense, each strip is 1.5 times the width of each color strip, so that the cyclic rate of change between any two phasing strips is precisely the same as for the color filter. Under these conditions, at the output of the band elimination filter 63, and as a part of the same signal which is supplied to the band pass filter 91, a color phasing signal occurs during the period when video transmission is blanked (return line period in line scanning). In the preferred operation the color phasing signal follows the line sync pulse and thus is added at a point which is often defined as the "back-porch."

The color phasing signal is ineffective in the output of the bandpass filter 91 because of transmitter blanking. It is, nonetheless, effective to pass through a gate 101 at times of gate opening. The gate 101 is preferably in the form of a tube having a multiplicity of grids, into one of which the output from the band elimination filter 63 is supplied, and to the other of which a keying or control signal is applied from a terminal point 103. At the terminal point 103 an input marked as "15 K. C. Key" is supplied. This input frequency is actually a frequency occurring at the rate of 15.75 kc. to represent, for present television standards, the line scanning rate. The pulse provided to open the gate 101 occurs for a very limited time on what is known as the "back-porch" of the line sync pulses and thus follows the line sync pulse. It can under some conditions be the line sync pulse delayed in phase long enough so that it opens the gate 101 following line sync. Since the line pulses are approximately 0.08 H long (where H is the line scanning period and thus equal to approximately 63.5 microseconds) the delay may be approximately 5.1 microseconds upon which time the gate will open. Since the only signals then present in the output of the band elimination filter 63 are the phasing signals it is clear that the phasing signals will be supplied to the discriminator 105. At all other times the gate 101 will be closed and the discriminator 105 receives no input from the gate 101. However, with an opening of the gate 101 and signals of the color cycle frequency always being available at terminal 107 it is evident that the signals indicative of the color phase available at the discriminator 105 will be discriminated against the constant frequency signals from terminal 107, which are the same frequency signals as supplied to terminal 70.

Such a discriminating period should correspond to approximately six to eight cycles of the color repetition frequency. The supplied frequency is represented on the drawing as 4 megacycles from the sync generator. In the illustrated example, this frequency is actually one repeating at the rate of 3.969 megacycles per second which is supplied by the sync generator.

Any phase or frequency differences between the color frequency developed from scanning as discriminated against the stable frequency of constant value in the discriminator 105 may then be supplied to a storage unit 109. The storage circuit is essentially a low pass filter circuit having a long time constant as compared to the scanning line period. Illustratively, the time constant of the circuit may be of the order of one-tenth second. Where it is desired to provide this supplemental control upon the tracking, the switch 112 is closed and the output signal from the storage unit 109 is then supplied as a secondary control to the mixer 61, along with the input available on the conductor 59, representing the correction necessary to establish precise tracking. Under the circumstances, it will be recognized that the components including the gate 101, the discriminator 105, and the storage unit 109, for supplying these phase control voltages are actually in the nature of accessories, although, for optimum operation of the apparatus, they are substantial essential adjuncts.

Where the control of the phase is established, the signal available at the terminal 97 to control the tracking not only accounts for a control which will establish uniformity of scanning beam motion within each scanned line of the picture, but will also control the initiation of the scanning motion and establish precisely the relationship thereof to one particular component color of the scanning.

Various modifications of the control of the tracking operation are, of course, possible, and these include certain of those mentioned in the companion application, Serial No. 184,186, already mentioned.

In the illustration of Fig. 5, there has been an attempt made to show the relationship between the superimposed tracking filter exemplified in Fig. 3 and the color filter of Fig. 1. To make clear the separation between the tracking filter 11' and the color filter 11, the tracking filter has been slightly displaced laterally with respect to the color filter, and the color components of the color filter have been omitted. Where it is desired to provide the tracking frequency at some other relationship than precisely the 3:2 herein suggested, it, of course, is possible to have the edges of the filters substantially parallel, although the filter sections will not precisely overlap one another. Further than this, where circuit additions can be tolerated whereby a shift from precise parallelism of the edges of the filters with respect to each other, these filters may be slightly transverse with respect to each other. However, under such circumstances, it is necessary, to insure accurate tracking and precise accuracy of color representation, to control not only the lateral motion of the scanning beam in its line deflection path, but also to interlock with this a control in the direction it moves from the top to the bottom, for instance, of the scanned image area. This correction then is provided in the field scanning direction, and introduces additional complexities in the operation. It is for these reasons that the invention, insofar as its circuitry or control is concerned, is explained particularly in connection with its simplest form.

It has been indicated in one embodiment of the invention as hereinbefore outlined that the tracking and color filters are separate one from the other. It is, however, possible to arrange them in such fashion that they are substantially adjacent one another, and in the same plane, for instance. For such circumstances it is possible to arrange certain of the strips in such a way that they become fluorescent and effectively operate to add light upon the photo-sensitive element of the camera tube so that the tracking frequency may be established.

Further than this, while it has been inferred for simplicity of reference that the color filter strips are all of the same width, it is believed to be evident that, if conditions so require, the strips may be of slightly different widths. For instance, by providing the filters with strips of slightly different width compensation for changes in color balance of the camera tube may be taken care of optically rather than to require electrical balance, according to well known principles. Under these circumstances, the relative widths of the red, blue and green filters may be slightly different, with the combined width such that they repeat as a group at the color cycle frequency selected. It nonetheless should be emphasized that since the camera should resolve the individual color strip, width variations thereof, as a general proposition, are not required. In addition, with apparatus of the type herein disclosed it also will be apparent that color balance in its broadest sense is readily realizable according to electrical control principles in about as easy a manner as anything to be expected. This is because the three separate component signals which are simultaneously present and available at the output terminals 83, 85 and 87 can be controlled with respect to each other through adjustment of the connecting point on the well known output resistors across which the load is derived.

The tracking filter strips also are preferably of like width, but it should be borne in mind that the operation may be carried on with these strips also of somewhat different widths. The significant feature is that the strip widths are such that, in projection, the strips are imaged on the camera tube to provide the desired tracking repetition frequency.

Further than this, within the meaning of what has herein been stated it should be understood, of course, that where reference is made to the parallelly positioned strips of the filters as they are imaged on the camera tube, the broad interpretation to be given is that the reference means essentially parallel. Likewise, where reference is made herein to the hues of the multicolor filter, this reference provides for filter strips of less than full saturation, and in such sense the term "hue" carries reference to the dominant wavelength of light transmitted. The term thus is essentially the equivalent, from the standpoint of interpretation, to the reference to the unsaturated filter herein described.

Further than this, while reference has been made in this specification to the arrangement of the field lens intermediate the main objective and the color filter 11, for instance, it will be appreciated that in actual practice the field lens may be arranged intermediate the filter 11 and the second objective 35, it being positioned, however, in proximity to the filter component.

Further than this, while reference has herein been made for simplicity of understanding to the fact that a 3:2 relationship has been selected for the relative tracking filter frequency and the color repetition cycle frequency, it is, of course, equally apparent that other relationships may be established. Where the relationship is other than a 3:2 relationship, for instance, the relative widths of the tracking filter strips as compared to any one of the color filter strips will not be the same. Also, where it is desired to have the color filter strips of different relative widths within each color cycle, it is equally apparent that even where the 3:2 relationship is maintained between the tracking filter frequency and the color repetition cycle frequency, the strip widths may not always correspond. Accordingly, within the meaning of the herein-claimed subject matter it will be understood that reference to the strip widths is to be interpreted in a manner sufficiently broadly to permit variances of such character in the arrangement.

The various forms of mixers have been indicated in block diagram form. From general knowledge of the art it will be understood that these may be of any well known and standard forms, such as tubes having multiple inputs or combining resistors or any other suitable and commonly known arrangements.

In the disclosed apparatus various amplifiers are also utilized in order to maintain the signal level and to bring it up to that required and desirable for the purpose of supplying to various line amplifiers, modulators, and, finally, into the transmitter. The amplifiers, per se, are those having generally flat characteristics such that they will amplify substantially uniformly signals of the various frequencies supplied. It is to be understood that they may be included at various parts of the apparatus disclosed. They have not been added herein to the illustration at this time because of the fact that the use of amplifiers as a separate component is well recognized in the art and their omission herein from both the illustration and the description has been solely for the purpose of simplifying the overall disclosure and illustration. The omission thus is not to be inferred as necessarily indicating that components of this nature may not be used.

The color cycle repetition frequency has been discussed herein as being, illustratively, of a frequency of 3.969 megacycles per second. As is evident from what has herein been stated, this corresponds to the two hundred fifty-second (252nd) harmonic of the line scanning frequency of 15.75 kc. established as standard for black-and-white. In the sync generator this frequency may readily be developed by multiplication stages of $$3\times3\times7\times4(=252)$$

In the NTSC system, where the frequency of color cycle repetition is selected at 3.89+ megacycles per second, the frequency value is selected as a harmonic of half the line scanning frequency, namely a harmonic of 7.875 kc. A frequency of this order may be used in connection with the instant disclosure by providing the color filter strips, for instance, of such width that they are massed approximately 531 to the inch, as projected upon the camera tube photo-sensitive element. For this assumption, there will be approximately 637 color filter strips (approximately 212 color cycles) projected, in the assumed 1.2" of width of the imaged area in the camera tube photosensitive element. This will provide individual color filter strips approximately 0.0019" wide, as contrasted with the herein-assumed strips of a width of approximately 0.0018" wide (more accurately, 0.00184" wide). Under the circumstances, the width of the individual filter strips to provide the color phasing effects is then very slightly wider than those herein assumed (the herein-assumed width of 0.0028" being actually slightly wider than the more accurately calculated 0.002765" width phasing strip).

As explained hereinabove, the color phasing filter is assumed to be located in such position relative to the tracking filter that the image of the phasing filter occupies the overscan area. From this statement and consideration of the invention as hereinbefore set forth in order to simplify the disclosure, it should not be inferred that there is an absence of tracking information indicative of the rate of scan in this overscan area. Were the phasing information of the color cycle repetition frequency only to be included, the desired precision of operation would not readily be attainable with the desirable degree of assurance. The invention therefore contemplates imaging filter strips on the photo-sensitive area of the camera tube in such a way that the effect manifested in the overscan area produces, with scanning, signals from which both the phase of the color repetition cycle and the tracking are simultaneously developed. This is similar to the case with the simultaneously present information relative to the color cycle repetition frequency and the rate of scan (the tracking) during the period of scansion of the effects manifested in the camera tube by the thereon-projected image of the scene.

In the event that the frequency selected is that which would provide the value assumed b ythe NTSC system, it is desirable to modify the sync signal generator which controls the scanning pattern on the camera tube to an extent such that the "4 mc." (3.89+ megacycles per second) and the "6 mc." (5.73+ megacycles per second) signals furnished are shifted in phase by an amount corresponding to half the period of the color repetition cycle on alternate fields. This compensates for the inherent color phase shift which occurs field-to-field due to using a color frequency which is a harmonic of one-half the line scanning frequency. A phase shift of such character is unnecessary in the herein assumed example using a color repetition cycle of 3.969 megacycles per second because the chosen frequency is a harmonic of the line scanning frequency of 15.75 kc.

The important and significant feature which characterizes the herein-proposed apparatus is that the frequency of repetition of the color cycle selected at the camera tube may be chosen completely independently of any color cycle repetition rate chosen for the final transmission. Thus, the camera color cycle repetition is merely illustrative, and not limiting. This is because of the fact that the herein-proposed apparatus makes possible the obtainment at its output for delivery to the load circuit of signals which are indicative of the mixed-highs, or picture detail, which is independent of the color cycle repetition frequency. In addition, the signals which are indicative of the color values only are all concurrently present and simultaneously available. The result is that color information in all colors is continuously available, so that the rate at which the individual controlling signals from which the color information is derived in insignificant and of no moment.

What is claimed is:

1. In color television apparatus wherein video signals are available to represent an image in a multiplicity of different additive unsaturated component colors sequentially and cyclically repeating at a frequency approaching the maximum transmitted, means for selecting from the available signals those included within an upper frequency range providing information relative to image detail, means to reduce the amplitude of the available signals by amounts approximating the pedestal heights due to the unsaturated color components so that the remaining signal levels are of substantially color information cyclically repeating at the color repetition frequency, and means for converting the cyclically repeating component color signals into simultaneously present signals indicative substantially of color value only and included within a frequency range having at least the major portion thereof of frequencies lower than the signals indicative of image detail.

2. In color television apparatus wherein video signals are available to represent an image in a multiplicity of different additive unsaturated component colors sequentially and cyclically repeating at a frequency approaching the maximum transmitted, a first signal path including a filter for selecting from the available signals those included within an upper frequency range providing information relative to image detail, a second signal path including means to reduce the amplitude of the available signals by amount approximating the pedestal heights due to the unsaturated color components so that the remaining signal amplitude represents substantially color information sequentially repeating at the color repetition frequency, and modulator and filter means for converting each of the sequentially derived component color signals into simultaneously present signals indicative substantially of color value only and included within a frequency range having at least the major portion thereof of lower frequency than the signals indicative of image detail.

3. In color television apparatus wherein video signals are available to represent an image in a multiplicity of different additive unsaturated component colors sequentially and cyclically repeating at a frequency approaching the maximum transmitted, a pair of signal paths each connected to receive the available signals, means included in one of the paths for selecting from the available signals those included within a frequency range extending from an intermediate value to the maximum frequency available for providing information relative to image detail, means included in the second signal path to reduce the amplitude of the available signals by amounts approximating the pedestal heights due to the unsaturated color components so that the remaining signal amplitude represents substantially color information sequentially repeating at the color repetition frequency, and modulator and filter means for converting each of the sequentially derived component color signals into simultaneously present signals indicative substantially of color value only and included within a frequency range having at least the major portion thereof extending from the lowest available frequency to the said intermediate value.

4. Color television apparatus for converting video signals representative of an image in a multiplicity of different additive unsaturated component colors sequentially and cyclically repeating at a frequency of the order of the maximum transmitted comprising a first signal path including a selector circuit for segregating from the available signals those included within an upper frequency range providing information relative to image detail, and a second signal path having means to reduce the relative amplitudes of the available signals to levels in which the signal amplitude represents substantially color information sequentially repeating at the color repetition frequency, and means for converting each of the sequentially repeating color information signals into simultaneously present signals indicative substantially of color value only and included within a frequency range having at least the major portion thereof of lower frequency than the signals indicative of image detail.

5. The apparatus claimed in claim 4 comprising, in addition, means to supply the color and image detail signals separately to a load circuit.

6. In color television apparatus wherein there is included a camera tube adapted to have impressed thereon color images so that by scansion signals are developed indicative of the image resolved into additive multi-color components cyclically repeating at a frequency *a* and accompanied by a second frequency component occurring at a frequency *b* to indicate the scanning rate and phase and also other frequencies representing high picture resolution, means to separate the developed signals into two separate signal trains of which one is representative only of the frequency and phase of the image scansion and the other is the complete developed frequency range with the information relative to the scanning rate and phase removed, means operative under the control of the segregated frequency and phase scansion rate signals to restore an optimum rate of scansion, means to derive from the signals of the complete developed frequency range minus the scanning rate and phase indications a train of mixed-highs signals representative of high image resolution, and a filter and modulator combination for deriving from the signals of the complete developed frequency range minus the scanning rate and phase indications concurrently present signal frequencies of each cyclically produced color component, said last named signals occupying a frequency range from substantially D. C. to approximately the lowest frequency in the mixed-highs group.

7. In color television camera apparatus, a camera tube adapted to have impressed thereon color images so that by scansion signals are developed indicative of the image resolved into its additive tricolor components cyclically repeating at a frequency *a* and a second frequency component occurring at a non-harmonically related frequency *b* to indicate the scanning rate and phase and also other frequencies representing high picture resolution in black-and-white monochrome, a pair of filters to separate the developed signals into two separate signal trains of which one is representative only of the frequency and phase of the image scansion within the tube and the other is the complete developed frequency range with the information relative to the scanning rate and phase removed, means to develop a constant frequency at the optimum rate of scansion, discriminator means responsive to the signals of the optimum scanning frequency and the segregated frequency and phase scansion rate signals to produce a constant signal to restore the optimum rate of scansion, means to derive from the signals of the complete developed frequency range minus the scanning rate and phase indications a train of mixed-highs signals representative of high image resolution, and a filter and modulator combination for deriving from the signals of the complete developed frequency range minus the scanning rate and phase indications signal frequencies of each cyclically produced color component of the scanned image, which last named signals occupy a frequency range from substantially D.C. to approximately the lowest frequency in the mixed-high group and are concurrently present.

8. In color television camera apparatus wherein optical images modified by a color filter having a plurality of cyclically repeating strips of the unsaturated component colors of a tricolor additive system and a tracking filter area are caused to develop a series of electrostatic charges which, when scanned, produce trains of signalling energy, a camera tube having means to scan the electrostatic charges to produce signals indicative of the image resolved into its additive tricolor components cyclically repeating at a frequency *a* and a second frequency component occurring at a non-harmonically related frequency *b* indicative of the scanning rate and phase and, in addition, other frequencies representing high detail picture resolution in black-and-white monochrome, the frequencies *a* and *b* each being harmonics of a third frequency *c*, filter means to separate the developed signals into two separate signal trains of which one is representative only of the frequency and phase of the image scansion and the other is the complete developed frequency range with the information relative to scanning rate and phase removed, means operative under the control of the segregated frequency and phase scansion to restore an optimum rate of scansion, a band pass filter to derive a train of mixed-highs signals representative energy-wise of high image resolution from the signals of the complete developed frequency range minus the scanning rate and phase indication, a source of constant frequency at the optimum color scanning cycle frequency, a modulator connected to respond to each of the constant frequency and the derived signals of the complete developed frequency range minus the scanning rate and phase indications to select the color information from the said signals and to produce concurrently present signal frequencies of each cyclically produced additive tricolor component color, the said color signals occupying a frequency range from substantially D. C. to approximately the lowest frequency in the mixed-high group.

9. In color television camera apparatus wherein color images projected thereupon initiate signals as a result of scansion which are indicative of the image resolved into its additive tricolor components cyclically repeating at a color repetition frequency *a* and accompanied by a second frequency component occurring at a non-harmonically related frequency *b* to indicate the scanning rate and also other frequencies representing high picture resolution in black-and-white monochrome, the frequencies *a* and *b* each being harmonics of a third frequency *c*, means to separate the developed signals into two separate signal trains of which one is representative only of the color scansion rate and the other is the complete developed frequency range with the information relative to the scanning rate removed, means to generate separately constant frequencies indicative of the optimum scansion rate, means to discriminate the segregated scansion rate signals against the separately developed constant rate signal to develop a control voltage to restore an optimum rate of scansion, means included in one signal path to derive from the signals of the complete developed frequency range minus the scanning rate indications a train of mixed-highs signals representative of image detail, and means included in a second signal path comprising a filter and modulator combination for deriving from the signals of the complete developed frequency range minus the scanning rate indications concurrently present signal frequencies of each cyclically produced color component and means to supply all of the signals to an output circuit.

10. In color television camera apparatus wherein color images projected thereupon initiate signals as a result of scansion which are indicative of the image resolved into its additive tricolor components cyclically repeating at a first frequency which are accompanied by signals of a thereto related frequency to indicate the scanning rate and phase and wherein still other signal frequencies represent high picture resolution in black-and-white monochrome, means to separate the developed signals into two separate signal trains one of which is representative only of the rate of color scansion and the other of which is representative of the complete developed frequency range with the information relative to the scanning rate removed, means operative under the control of the segregated signals indicative scansion rate to restore an optimum rate of scansion, means to derive from the signals of the complete developed frequency range minus the signals indicative of the scanning rate a first train of mixed-highs signal frequencies representative of image detail and a second train of concurrently present signal frequencies of each cyclically produced component.

11. In color television apparatus wherein video signals are sequentially produced to represent a multiplicity of different unsaturated component colors of an additive color sequence cyclically repeating at a frequency approaching the maximum transmitted are available, a first signal path including a filter for selecting from the available signals those included within the order of the upper half of the range of frequencies, said selected signals providing image detail and being known as "mixed-highs," means included in a parallel signal path to reduce the amplitude of the available signals to levels such that the pedestal signal amplitude due to unsaturated component color representations therein is of relatively small magnitude compared to the color component signals, means to modulate the signals having the reduced pedestal amplitude at the frequency of the sequential color production to derive therefrom a sequence of substantially saturated color component signals repeating at the color cycle, and a plurality of low pass filters for converting each of the separate color component signals into simultaneously present signals occupying a frequency range included within the order of the lower half of the range of frequencies of the signal initially available.

12. In color television apparatus wherein video signals are available to represent an image in a multiplicity of different additive unsaturated component colors sequentially and cyclically repeating at a frequency approaching the maximum transmitted, means included in a first signal path for selecting from the available signals those included within an upper frequency range providing information relative to image detail, means included in a second signal path to reduce the relative amplitudes of the available signal frequencies to levels in which the signal amplitude represents substantially the saturated component color information sequentially repeating at the color repetition frequency, and means for converting each of the sequentially derived color component signals into simultaneously present signals included within a frequency range having at least the major portion thereof of lower frequency than the signals indicative of image detail.

13. In color television apparatus wherein video signals are available to represent an image in a multiplicity of different unsaturated component colors sequentially produced in additive component colors cyclically repeating at a frequency approaching the maximum transmitted, a first signal path including a band pass filter for selecting from the available signals those included within at least the upper half of the frequency range for providing information relative to image detail to the exclusion of color information, a second parallel signal path including a pedestal suppressor to change the signal amplitude to simulate substantially saturated component color signals, a modulator to derive from the last named signals a cyclically repeating sequence of component color signals and a plurality of low pass filters each receiving one of the sequentially derived color component signals and converting the signal received into simultaneously present signals indicative substantially of only color value and included within a frequency range having at least the major portion thereof of lower frequency than the signals indicative of image detail.

14. In color television apparatus wherein video signals are available to represent an image in a multiplicity of different unsaturated component colors sequentially produced in additive component colors cyclically repeating at a frequency approaching the maximum transmitted, a first signal path including a filter for selecting from the available signals those included within a frequency range between an intermediate value and substantially the maximum developed to provide information relative to image detail to the exclusion of color information, a second parallel signal path including means to reduce from the available signal frequencies selected portions of the pedestal signal amplitude due to unsaturated component color representations therein relative to the remaining signals, modulator means controlled at the color repetition frequency to derive from the signals having the reduced pedestal signal amplitude a cyclically repeating sequence of component color signals representing substantially saturated color components of the image repeating at the color cycle frequency, and a plurality of parallelly connected low-pass filters of a number corresponding to number of component colors for converting each of the sequentially derived color component signals into simultaneously present signals indicative substantially of only color value and included within a frequency range having at least the major portion thereof of lower frequency than the signals indicative of image detail.

15. In color television apparatus wherein video signals are available to represent an image in a multiplicity of different additive unsaturated component colors sequentially and cyclically repeating at a frequency approaching the maximum transmitted, a filter in a first signal path for selecting from the available signals those included within an upper frequency range between a generally mid-frequency and the maximum frequency transmitted for providing information relative to image detail, means included in a second signal path for reducing the available signal amplitude by approximately the amplitude level of the pedestal signal amplitude due to unsaturated component color representations therein, a modulator means controlled at the color repetition frequency to derive a sequence of component color signals representing substantially saturated color components from the signals having the pedestal portions reduced which occur at the color repetition frequency, and means for converting each of the sequentially derived color component signals into simultaneously present signals indicative substantially of only color value and included within a frequency range having at least the major portion thereof of lower frequency than the signals indicative of image detail and extending generally from the minimum frequency to generally the selected mid-frequency.

16. In color television apparatus wherein a camera tube is included and upon which color images are impressed so that as a result of scansion of the image in a line-for-line manner which is repeated at a selected field repetition rate signals are developed which are indicative of the image resolved into additive multicolor components sequentially and cyclically repeating at one selected frequency and which are accompanied by signals of a second selected frequency related to the first-named cyclically repeating frequency to indicate the rate of scansion together to form a composite signal series, a first signal path for deriving from the composite signal series those signals which are indicative of the rate of image scansion, discriminator means to compare the said derived signals with a standard to develop a control voltage of magnitude and polarity representative of departures from an optimum scanning rate in either a faster or a slower direction, a second signal path including therein means to eliminate from the composite signals those signals indicative of the rate of scansion and to pass the remaining signals, a pair of load circuits connected to receive the last-named output signals, one of said load circuits including means to reduce the available signal amplitude level representing substantially color information sequentially repeating at the color cycle frequency by amounts approximating the pedestal heights due to unsaturated color components, means for converting the last-named signals to concurrently present signals of each component color simulating saturated color components each occupying a frequency band from substantially the lowest frequency developed to a value which at a maximum is substantially lower than that of the highest developed frequency, the second load circuit including means for deriving from the complete group of signals those signals indicative substantially only of detail in the image, said last-named signals occupying a frequency band in which the minimum frequency is substantially higher than the lowest developed frequency and of which the maximum frequency is substantially the highest developed, a mixer circuit to receive at its input the discriminator output indicative of departures from optimum in the tracking rate of scansion, a delay line circuit having a delay period coinciding with one scanning line connected to receive the mixer output, a connection for feeding the output of the delay line to a second input to the mixer, and means for supplying the output from the mixer to control the tracking rate of scansion in the camera.

17. The control circuit claimed in claim 16 comprising, in addition, an integrator circuit having a delay period of a time period of the order of one field scansion connected to receive the discriminator output and to supply said discriminator output to the mixer as a separate input thereto.

18. The apparatus claimed in claim 16 comprising, in addition, an integrator circuit having a time constant of the order of periods of repetition of field scannings connected to receive at its input the discriminator output signal, and means to supply the integrated output therefrom to the mixer in parallel with the discriminator mixer input and the regenerated input with the scanning line period delay.

19. The apparatus claimed in claim 18 comprising, in addition, means for developing a phasing signal following each line of image analysis and during the period of video signal blanking, said signal being developed at a frequency substantially corresponding to the frequency of repetition of the color cycle signal, a discriminator connected to receive as one input signal the said phasing signals, means to supply as a second input to the discriminator signals of constant frequency and phase corresponding precisely to an optimum color repetition frequency so that at the output of the discriminator a voltage is developed indicative of the departures of phase in either a lagging or leading condition of the color cycle from an optimum, and a mixer circuit connected intermediate the discriminator providing control signals indicative of departures from normalcy in the rate of tracking, and the tracking control mixer for providing a modified mixer input.

20. In color television apparatus wherein a camera tube is included to have color images impressed thereon and to develop, as a result of scansion in a line-for-line manner of the image repeating at a selected field repetition rate, signals indicative of the image resolved into additive multicolor components cyclically repeating at one selected frequency accompanied by signals of a second selected frequency related to the first-named cyclically repeating frequency to indicate the rate of scansion and also frequencies following each line of image scansion which are indicative of the phase of image line scansion, said last-named signals being developed during periods of interruption of image signal production, a first signal path for deriving from the composite of all said signals those signals indicative of the rate of image scansion, means to compare the said derived signals with a standard to develop a control voltage of magnitude and polarity representative of departures from an optimum scanning rate in either a faster or a slower direction, a second signal path including therein means to eliminate from the composite signals those signals indicative of the rate of scansion and to pass the remaining signals, a pair of load circuits connected to receive the last-named output signals, one of said load circuits including means to reduce the available signal amplitude level representing substantially color information sequentially repeating at the color repetition frequency by amounts approximating the pedestal heights due to unsaturated color components, means for converting the last-named signals to concurrently present signals of each component color simulating saturated color components each occupying a frequency band from substantially the lowest frequency developed to a value which at a maximum is substantially lower than that of the highest developed frequency, the second of said load circuits including means for deriving from the complete group of signals those signals indicative of substantially only detail in the image, said last-named signals occupying a frequency band in which the minimum frequency is substantially higher than the lowest developed frequency and of which the maximum frequency is substantially the highest developed, a gate circuit connected to receive the signal frequency band from which information as to the rate of scansion has been removed, means for opening the gate circuit to control by signals supplied thereto only during selected periods of interruption in line scansion, means for developing signals of a constant frequency occurring at the optimum color repetition frequency, means for discriminating the signals effective upon the open gate circuit during periods of image scanning interruption against the constant frequency color repetition frequencies to develop a control voltage indicative of departures in the actual rate of scansion in either a slower or a faster rate from an optimum, a mixer circuit to receive at its input the outputs from the said two discriminators indicative of departures from optimum in the tracking rate of scansion and in the color cycle repetition phase and rate of scansion and to develop at its output a control voltage measuring the combination of said departures from normal, and a second mixer circuit having a plurality of input circuits connected thereto, means for supplying the output of the first mixer directly to one of the input circuits of the second mixer, a delay line circuit having a delay period coinciding with one scanning line connected to receive the mixer output, means for feeding the output of the delay line to a second input of the second mixer circuit, and means for supplying the output from the second mixer circuit to control the tracking rate of scansion in the camera.

21. The control circuit claimed in claim 20 comprising, in addition, a storage circuit having a storage time period of the order of seconds connected to receive the output indicative of color phase shift in line scanning and to supply the output therefrom to the first of said mixers.

22. The control circuit claimed in claim 21 comprising, in addition, an integrator circuit having a delay period of a time period of the order of one field scansion connected to receive the output of the first-named mixer and to supply its output as one of the inputs to the second-named mixer.

References Cited in the file of this patent

UNITED STATES PATENTS

| | | |
|---|---|---|
| 2,554,693 | Bedford | May 29, 1951 |
| 2,558,489 | Kalfaian | June 26, 1951 |
| 2,594,380 | Barton et al. | Apr. 29, 1952 |
| 2,604,534 | Graham | July 22, 1952 |
| 2,605,349 | Homrighous | July 29, 1952 |
| 2,615,974 | Danke | Oct. 28, 1952 |
| 2,630,485 | Heikes et al. | Mar. 3, 1953 |
| 2,635,140 | Dome | Apr. 14, 1953 |
| 2,657,257 | Lesti | Oct. 27, 1953 |
| 2,674,651 | Creamer | Apr. 6, 1954 |

OTHER REFERENCES

Loughren et al.: Comparative Analysis of Color TV System, Electronics, February 1951, page 92.

A Six-Megacycle Compatible High-Definition Color Television System, Radio Corporation of America, Sept. 26, 1949, page 11.

U. S. DEPARTMENT OF COMMERCE

PATENT OFFICE

CERTIFICATE OF CORRECTION

Patent No. 2,827,512 March 18, 1958

Robert J. Stahl et al.

It is hereby certified that error appears in the printed specification of the above numbered patent requiring correction and that the said Letters Patent should read as corrected below.

Column 1, line 44, for "much" read -- such --; column 7, line 18, for "parallelisms" read -- parallelism --; column 15, line 33, for "for" read -- from --; column 25, line 8, for "derived in" read -- derived is --.

Signed and sealed this 20th day of May 1958.

(SEAL)

Attest:

KARL H. AXLINE

Attesting Officer

ROBERT C. WATSON
Commissioner of Patents